(12) United States Patent
Pfeiffer et al.

(10) Patent No.: US 11,379,684 B2
(45) Date of Patent: *Jul. 5, 2022

(54) TIME OF FLIGHT DATA SEGMENTATION

(71) Applicant: Zoox, Inc., Foster City, CA (US)

(72) Inventors: David Pfeiffer, Foster City, CA (US); James William Vaisey Philbin, Palo Alto, CA (US); Nitesh Shroff, Millbrae, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,446

(22) Filed: Feb. 19, 2021

(65) Prior Publication Data

US 2021/0192273 A1 Jun. 24, 2021

Related U.S. Application Data

(63) Continuation of application No. 16/294,772, filed on Mar. 6, 2019, now Pat. No. 10,929,711.

(51) Int. Cl.
*G06K 9/62* (2022.01)
*G06N 20/00* (2019.01)
*G08G 1/13* (2006.01)

(52) U.S. Cl.
CPC ......... *G06K 9/6221* (2013.01); *G06K 9/6269* (2013.01); *G06N 20/00* (2019.01); *G08G 1/13* (2013.01)

(58) Field of Classification Search
CPC ...... G06K 9/6221; G06K 9/6269; G06K 9/62; G06K 9/6296; G08G 1/13; G06N 20/00; G05D 1/021

See application file for complete search history.

(56) References Cited

U.S. PATENT DOCUMENTS

| | | | |
|---|---|---|---|
| 10,176,388 B1* | 1/2019 | Ghafarianzadeh ... | G06N 3/0454 |
| 2019/0026588 A1 | 1/2019 | Ryan | |
| 2019/0138024 A1* | 5/2019 | Liang ................... | G06K 9/6273 |
| 2019/0293772 A1* | 9/2019 | Pfeiffer ................ | G05D 1/0088 |
| 2020/0126237 A1* | 4/2020 | Pfeiffer ................ | G05D 1/0253 |

OTHER PUBLICATIONS

Non Final Office Action dated Sep. 17, 2020 for U.S. Appl. No. 16/294,772, "Time of Flight Data Segmentation", Pfeiffer, 6 pages.

* cited by examiner

*Primary Examiner* — John J Lee
(74) *Attorney, Agent, or Firm* — Lee & Hayes, P.C.

(57) ABSTRACT

Techniques are discussed for segmenting sensor data captured by a sensor to remove a ground surface from the sensor data. A first technique includes capturing sensor data represented as multichannel image and segmenting the image according to image processing techniques. The ground surface can be removed from the sensor data, and a subset of the sensor data can be associated with a voxel space. A second technique includes capturing sensor data and unprojecting the sensor data to generate three dimensional data, which can be associated with a voxel space. Ground plane data associated with a location can be accessed or determined and voxel data that is within a threshold height of the ground plane data can be removed from the voxel space. Clustering techniques can determine objects represented in the data, and a vehicle can be controlled based on the objects.

20 Claims, 7 Drawing Sheets

TIME OF FLIGHT DATA SEGMENTATION

CROSS REFERENCE TO RELATED APPLICATIONS

This is a continuation application which claims priority to commonly assigned, co-pending U.S. patent application Ser. No. 16/294,772, filed Mar. 6, 2019. Application Ser. No. 16/294,772 is fully incorporated herein by reference.

BACKGROUND

Segmentation is one type of data analysis that is often used for partitioning data into different segments to provide a more meaningful representation of the data (e.g., dividing data based on a type of object associated with the data). In some examples, segmentation techniques may be used on two dimensional data or on three dimensional data. Segmentation techniques can be used in autonomous vehicles or robotics to identify objects in an environment around such vehicles or robots.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
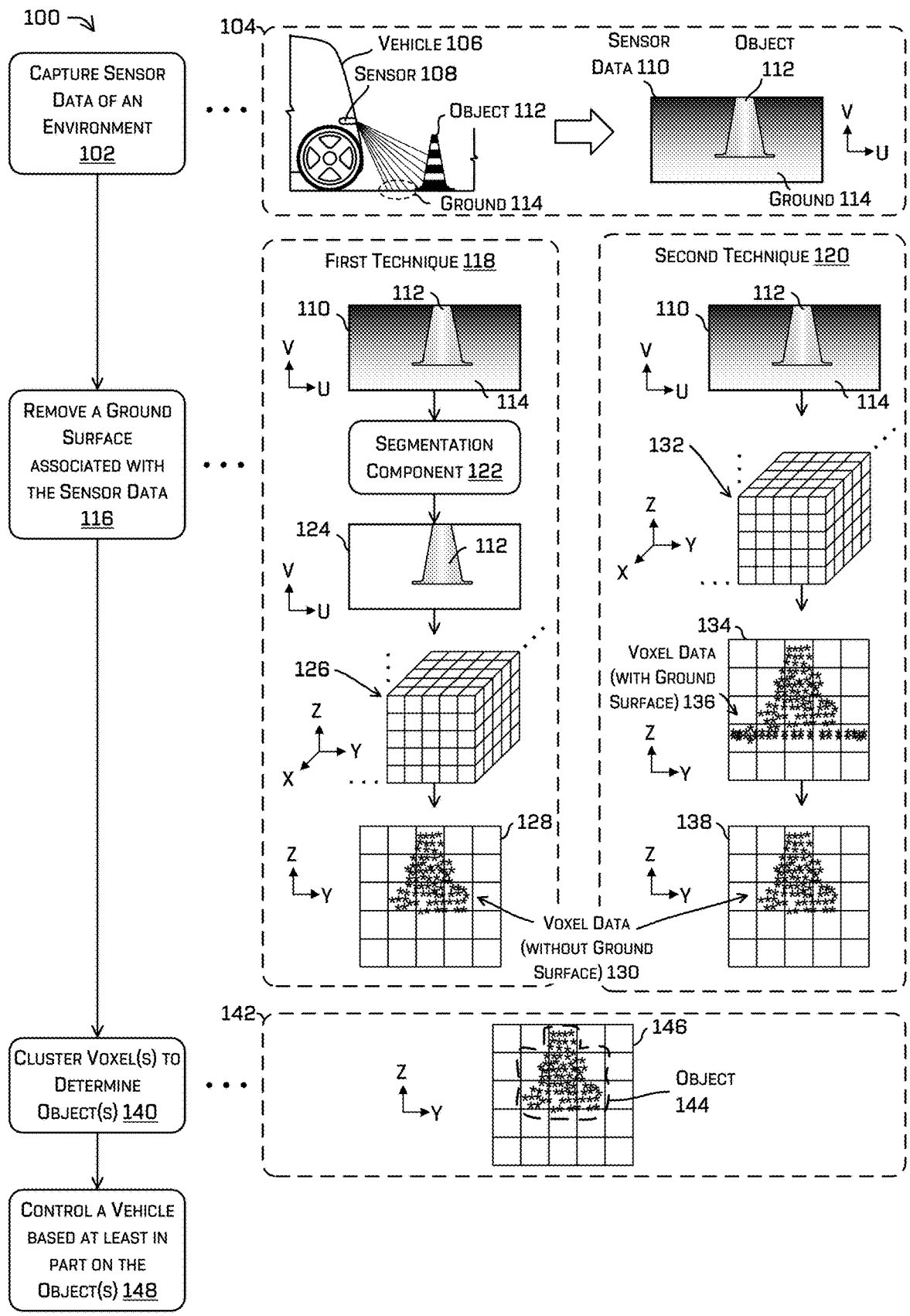
FIG. 1 is a pictorial flow diagram of an example process for capturing sensor data, removing a ground surface, clustering voxels to determine objects, and controlling a vehicle based on the objects, in accordance with embodiments of the disclosure.

This disclosure is directed to techniques for segmenting sensor data. In some examples, the techniques discussed herein can be used to remove a ground surface associated with the sensor data. In some examples, techniques using image-based processing and point-cloud based processing can be applied to sensor data to leverage aspects of both techniques to determine useful information about the data. A first technique can include capturing sensor data by a time of flight sensor and segmenting the data, such as by a machine learning model trained to output segmentation information associated with the sensor data. In some instances, the ground surface can be removed from the sensor data, and a subset of the sensor data can be associated with a voxel space. A second technique can include capturing sensor data by a time of flight sensor and unprojecting the two dimensional sensor data to generate three dimensional data, which can be associated with a voxel space. Ground plane data associated with a location can be accessed and voxel data that is within a threshold height of the ground plane data can be removed from the voxel space. Accordingly, the first technique and the second technique can be used separately or together to generate voxel data with a ground surface removed. Clustering techniques can be used with respect to the voxel data to determine objects represented in the data, and the objects can be associated with one of a dynamic grid or a static grid. A vehicle can be controlled based at least in part on the objects associated with the dynamic grid or the static grid.

In some examples, sensor data captured by a time of flight sensor can include two dimensional data of an environment. In some examples, an individual "pixel" of the data (or an individual element) can include depth information, intensity information, and/or confidence information (although the data may include any number of channels). In some examples, the sensor data can be unprojected to determine three dimensional data (e.g., including an x-coordinate, a y-coordinate, and a z-coordinate). In some examples, the unprojection operation can be based at least in part on extrinsic information associated with the time of flight sensor. For example, extrinsic information can include, but is not limited to, a location of the sensor in an environment (e.g., x, y, z, yaw, pitch, roll), such as with respect to a mounting location on a vehicle.

In some examples, the two dimensional sensor data can be input to a segmentation component, such as a machine learning component trained to determine segmentation information associated with the sensor data. For example, the segmentation information can include categories of objects including but not limited to, a vehicle (e.g., the vehicle capturing the sensor data), unknown, pedestrian, a vehicle (e.g., a third party vehicle), bicycle, ground, construction (e.g., cones), not returned, and the like. In some instances, the segmentation information can be determined for each pixel of the sensor data. In some instances, the segmentation information can be associated with three dimensional data (e.g., if the sensor data is unprojected to generate three dimensional data).

In the case where the segmentation information identifies a ground surface in sensor data, a technique (e.g., the first technique, discussed above) can include removing the ground surface from the data to minimize an amount of data to be unprojected to generate three dimensional data. Additionally, the segmentation information can be used to more accurately identify a ground surface in "image" data and/or voxel data, and can be used to more accurately cluster data in the voxel space to identify objects and/or to more accurately determine whether an object is a static object or a dynamic object, for example.

In some instances, the sensor data can be unprojected prior to, after, or substantially simultaneously with removing a ground surface (e.g., the second technique, discussed above). The three dimensional data can be associated with a voxel space, which may represent discrete regions of space in an environment. In some instances, the second technique can include accessing ground plane data based on a location associated with the sensor data. In some examples, the ground plane data can be based at least in part on one or more of region growing, prior sensor data indicating a ground plane, a mesh that is associated with a ground plane (e.g., based on lidar data that has been captured and used to generate the ground plane data), and the like. Although referred to as "ground plane data," it is to be understood that a ground surface may not necessarily be a "plane," and the ground surface may represent any shape of an environment and/or may be referred to as "ground data." In some examples, the ground plane data can be associated with the voxel space including the three dimensional data. Data that is within a threshold height of the ground plane data can be determined to represent a ground surface of the environment, and the ground surface can be removed from voxel data represented in the voxel space. In some cases, the threshold height can be determined based on noise in the data associated with such captured data, and may be dependent on a sensor type or environmental factors such as temperature, weather, lighting, and the like.

The first technique and/or the second technique can be used to generate voxel data in a voxel space whereby a ground surface is removed from the voxel data. Next, clustering techniques can be used to cluster adjacent occupied voxels to determine objects. In some cases, segmentation information can be used to more accurately determine the objects (e.g., by providing an additional variable for clustering).

Objects can be associated with a dynamic grid that tracks dynamic entities in an environment. If the object corresponds to a dynamic object in the dynamic grid, the object can be tracked as a dynamic object. If the object does not correspond to a dynamic object in the dynamic grid, the object can be associated with a static grid. In some cases, voxel data can be evaluated over time to determine that an object that is not represented in the dynamic grid or the static grid is a new dynamic object, and operations can include determining a track associated with the object and adding the object to the dynamic grid. A vehicle (such as an autonomous vehicle) can be controlled based at least in part on the dynamic and/or the static grids. In the case the object is associated with the dynamic grid, the vehicle can be controlled to follow the object, for example. In the case the object is associated with the static grid, the vehicle can be controlled (e.g., a trajectory can be generated) to avoid the object in the environment represented by the object.

As noted above, three dimensional data based on the sensor data can be associated with a voxel space. In some cases, the voxel space can comprise data from a plurality of sensors and/or a plurality of types of sensors. For example, a vehicle may include a plurality of time of flight sensors disposed about a vehicle. In some cases, the sensors may include overlapping fields of view to provide a complete or nearly complete representation of the area proximate the vehicle. Sensor data from a plurality of sensors can be combined in a data metaspin (e.g., data from multiple sensors can be aggregated based on being captured within a threshold amount of time) and associated with the voxel space to represent a 360-degree view (or any portion of space) around the vehicle.

In some instances, a size of a voxel grid of the voxel space can be based at least in part on a distance between an origin and the voxel grid. For example, voxels within 2 meters of the vehicle (or a first threshold distance) can be represented by a first size, while voxels between 2 meters and 20 meters of the vehicle (or between the first threshold and a second threshold) can be represented by a second size. In some instances, the first size can be a 5 cm cube, while in some cases, the second size can be a 50 cm cube. Of course, these thresholds and sizes are examples and other thresholds and sizes are contemplated herein.

In some examples, the voxel space can include sensor data from different sensor types. For example, data in a voxel space can include data captured by one or more of a time of flight sensor, a lidar sensor, a radar sensor, and the like.

The techniques described herein can improve a functioning of a computing device by providing a framework for efficiently segmenting data for object tracking and/or navigation of a vehicle. In some instances, complex multidimensional data, such as time of flight data, can be represented in a voxel space, which can partition the data, allowing for efficient evaluation and processing of the data. In some instances, the voxel space can represent a sparse voxel space, which reduces an amount of data for processing. In some instances, a ground surface can be identified and removed using geometric techniques and/or based on segmentation information determined using a machine learning component. In some instances, generating three dimensional data based on two dimensional data allows the three dimensional data to be combined with other data in a voxel space. Static and dynamic objects can be identified using robust clustering techniques, which further simplifies processing by focusing tracking operations on dynamic objects, for example. Further, segmentation information can be used while clustering to more accurately cluster voxels in a voxel space. Further, the techniques discussed herein can be implemented in vehicles or autonomous vehicles to improve safety outcomes to generate trajectories and/or control the vehicles to avoid static and dynamic objects in an environment. In some instances, the operations described herein may reduce memory requirements or reduce an amount of processing by operating on voxelized data to efficiently simplify the data. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Further, although described in connection with time of flight data, the methods, apparatuses, and systems described herein are not limited to two dimensional or three dimensional data, and are not limited to time of flight data. In one example, the methods, apparatuses, and systems may be utilized in a two-dimensional context with radar data, or used with three dimensional or horizontal lidar data. Further, the datasets may include data from stereoscopic cameras, depth cameras, radar sensors, acoustic sensors, etc., and may include any number of layers or channels, which may correspond to any number of dimensions. Additionally, the techniques described herein can be used with real data (e.g., captured using sensor(s)), simulated data (e.g., generated by a simulator), or any combination of the two.

FIG. 1 is a pictorial flow diagram of an example process 100 for capturing sensor data, removing a ground surface, clustering voxels to determine objects, and controlling a vehicle based on the objects, in accordance with embodiments of the disclosure.

At operation 102, the process can include capturing sensor data of an environment. In some examples, the sensor data can be captured by one or more sensors on a vehicle (autonomous or otherwise). For example, the sensor data can include data captured by a time of flight sensor. In the context of a time of flight sensor capturing sensor data, which may be considered as a two dimensional image or any multi-channel data set, each "pixel" or element of the sensor data can comprise depth information, intensity information, and/or confidence information. In some examples, the sensor data can include data captured by one or more of a lidar sensor, a radar sensor, an image sensor, a sonar sensor, and the like.

An example 104 illustrates a vehicle 106 comprising a sensor 108 capturing sensor data 110 of an object 112 in an environment. In some instances, the sensor 108 may be mounted on the vehicle 106 to capture an area of a ground 114 proximate to the vehicle in addition to data representing the object 112. As illustrated, the object 112 can represent a construction cone, although the object 112 can represent any object in an environment. In some instances, the sensor data 110 can be represented in the form of a two dimensional image, as indicated by the (u, v) coordinates illustrated in FIG. 1. For the purposes of illustration, relative depth values in the sensor data 110 are represented by shades of gray between white and black.

At operation 116, the process can include removing a ground surface associated with the sensor data. Exemplary techniques for removing the ground surface are illustrated as a first technique 118 and a second technique 120.

Example operations of the first technique 118 are illustrated in FIG. 1. The sensor data 110 can be received, wherein the sensor data 110 can represent the object 112 and the ground 114 in the sensor data 110. In some instances, the sensor data 110 can comprise depth information, intensity information, and confidence information.

In some examples, various image-based segmentation techniques can be leveraged by representing the data as an "image." As illustrated, the sensor data 110 can be input to a segmentation component 122 which may include a machine learning component trained to determine segmentation information (e.g., identifying the object 112 and the ground 114). The segmentation information can be used to remove the ground 114 from the sensor data 110 by removing, or otherwise discarding, portions of the data associated with a drivable surface to generate a subset of the sensor data 124. The subset of the sensor data 124 can be associated with a voxel space 126 (which may include unprojecting the sensor data, as discussed herein). The voxel space 126 comprises a three dimensional representation of an environment, as indicated by the (x, y, z) coordinates in FIG. 1. A plan view 128 (as indicated by the (z, y) coordinates) of the voxel space 126 illustrates the voxel data 130 (e.g., without the ground surface).

Additional aspects of the first technique 118 are discussed in connection with FIGS. 2 and 3, as well as throughout this disclosure.

Example operations of the second technique 120 are illustrated in FIG. 1. The sensor data 110 can be received, wherein the sensor data can represent the object 112 and the ground 114 in the sensor data 110. In some instances, the sensor data 110 can be associated with a voxel space 132 (which may include unprojecting the sensor data, as discussed herein). A plan view 134 of the voxel space 132 illustrates the voxel data 136 (e.g., with the ground surface).

The second technique 120 can further include accessing ground plane data of the environment based on a location of the vehicle 106 and removing a portion of the voxel data 136 within a threshold height of the ground plane data. An example voxel space 138 illustrates the voxel data 130 (without the ground surface). Such ground plane information may be determined, for example, using region growing techniques, determined based on other sensor modalities, and/or received from a mesh and/or map. Examples of such region growing techniques are discussed in U.S. patent application Ser. No. 15/622,905, filed Jun. 14, 2017. Application Ser. No. 15/622,905 is herein incorporated by reference, in its entirety.

Additional aspects of the second technique 120 are discussed in connection with FIG. 4, as well as throughout this disclosure.

At operation 140, the process can include clustering voxel(s) to determine object(s). An example 142 illustrates an object 144 represented in a voxel space 146. By way of example, and without limitation, the object 144 can correspond to the object 112 in the environment. In some instances, the voxel space 146 can correspond to the voxel spaces 126, 128, 132, 134, and/or 138. In some instances, the operation 140 can include utilizing a variety of clustering algorithms, including but not limited to: region growing; hierarchical clustering; partitional clustering; square error clustering; graph theoretic clustering; mixture-resolving clustering; mean-seeking clustering; k-means clustering; N-cut clustering; proximity clustering; etc. In at least some examples, segmentation information provided by the first technique 118 may be used as an additional variable in the clustering procedures (e.g., in addition to the point-cloud based ground surface removal using the second technique).

At operation 148, the process can include controlling a vehicle based at least in part on the object(s). For example, the operation 148 can include determining whether the object 144 corresponds to a dynamic object in a dynamic grid or a static object in a static grid. In some instances, the operation 148 can include generating a trajectory for the vehicle to follow in the environment while traversing around the object(s).

Figure 2:
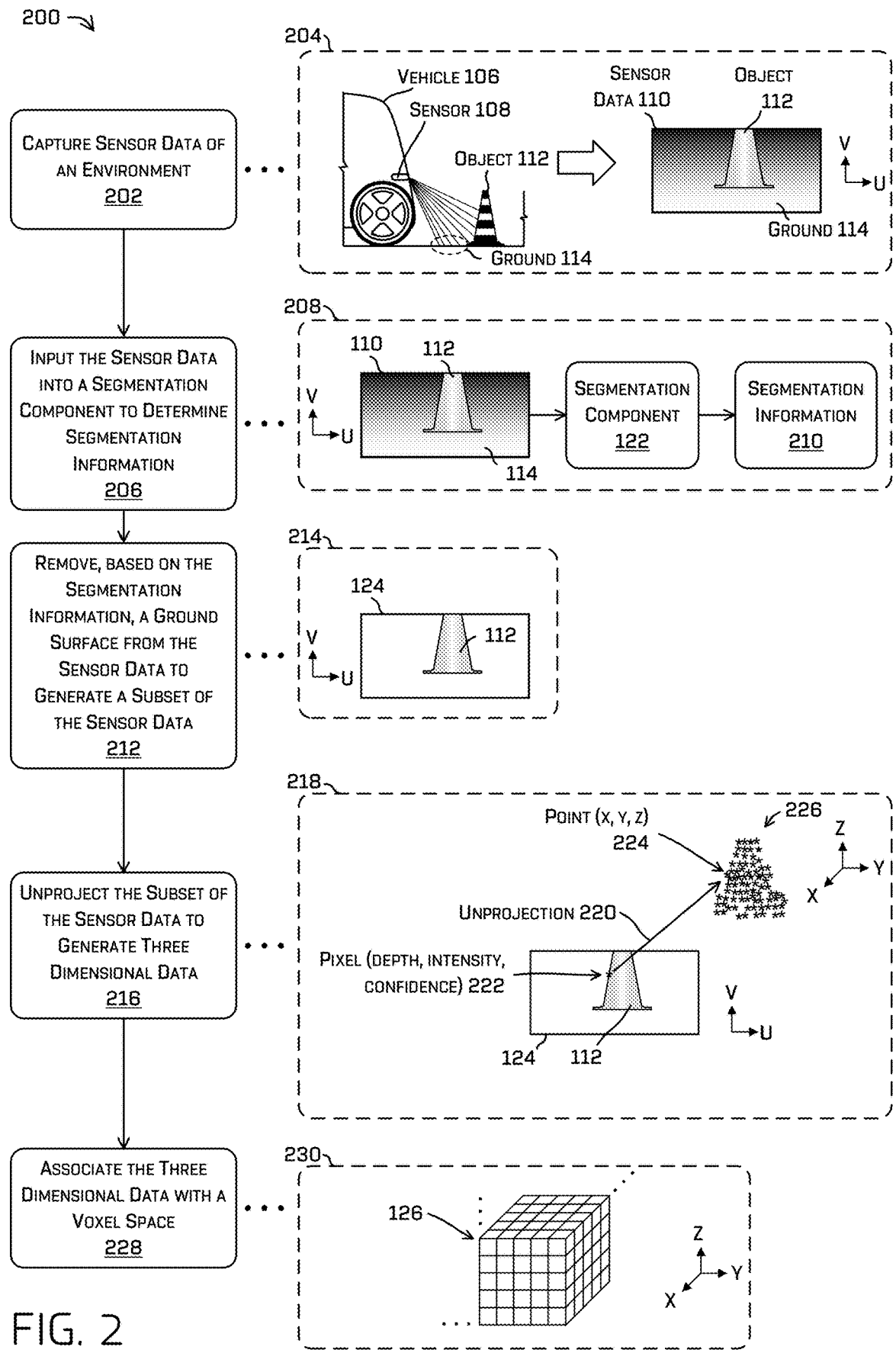
FIG. 2 is pictorial flow diagram of an example process of a first technique for removing a ground surface based on image segmentation, in accordance with embodiments of the disclosure.

FIG. 2 is pictorial flow diagram of an example process 200 of a first technique for removing a ground surface based on image segmentation, in accordance with embodiments of the disclosure.

In some examples, the process 200 illustrates operations associated with the first technique 118 of FIG. 1.

At operation 202, the process can include capturing sensor data of an environment. In some instances, the operation 202 can substantially correspond to the operation 102 in FIG. 1. An example 204 illustrates the vehicle 106 including the sensor 108 capturing the sensor data 110 of the environment. In some instances, the sensor data 110 can represent the object 112 and the ground 114 in the environment.

At operation 206, the process can include inputting the sensor data into a segmentation component to determine segmentation information. An example 208 illustrates the sensor data 110 being input to the segmentation component 122 to determine segmentation information 210. In some instances, the segmentation information 210 can be generated per data point for the sensor data 110. That is, in some instances, each "pixel" of the sensor data 110 as represented in an image format can be associated with individual segmentation information 210. Additional details of the segmentation component 122 and the segmentation information 210 are discussed in FIG. 3 and throughout this disclosure.

At operation 212, the process can include removing, based at least in part on the segmentation information, a ground surface from the sensor data to generate a subset of the sensor data. An example 214 illustrates the subset of the sensor data 124 with the ground surface removed. In some examples, the operation 214 can include deleting or otherwise removing data representing the ground surface from the sensor data 110 or updating a flag to indicate that a portion of the sensor data 110 corresponds to the ground 114 and that such data is not to be considered for subsequent operations.

At operation 216, the process can include unprojecting the subset of the sensor data to generate three dimensional data. An example 218 illustrates an unprojection 220 operation whereby a pixel 222 (e.g., represented as two dimensional data in the subset of the sensor data 124) is unprojected to determine a point 224 of three dimensional data 226. In some examples, the pixel 222 can include depth information, intensity information, and/or confidence information. In some instances, the pixel 222 can additionally be associated with the segmentation information 210. In some instances, the point 224 can represent the pixel 222 in the three dimensional data 226. That is, the point 224 can comprise an x-coordinate, y-coordinate, and a z-coordinate. In some instances, the point 224 can further comprise the segmentation information 210. That is, the segmentation information 210 determined based on the two dimensional sensor data 110 can be directly applied to the three dimensional data 226.

As used herein, the term "unproject," "unprojected," "unprojecting," or "unprojection" can refer to a conversion of two dimensional data into three dimensional data, while in some cases, the term "project," "projected," "projecting," or "projection" can refer to a conversion of three dimensional data into two dimensional data.

In some instances, the unprojection 220 can be based at least in part on extrinsic information associated with the sensor 108, such as the location of the sensor 108 on the vehicle 106, a height of the sensor 108, a direction of the sensor 108, a field of view of the sensor 108, and the like. In some instances, the pixel 222 can be unprojected based on a known location of the sensor 108 into the environment based at least in part on the depth information associated with the pixel 222.

At operation 228, the process can include associating the three dimensional data with a voxel space. An example 230 illustrates the voxel space 126, whereby the three dimensional data 226 can be associated with the voxel space 126. In some examples, the three dimensional data 226 can be input to the voxel space 126 based at least in part on the (x, y, z) coordinates of each point associated with the three dimensional data 226.

In some examples, the three dimensional data 226 (e.g., voxel data) represented in the voxel space 126 can be clustered to determine object(s), as discussed herein.

Figure 3:
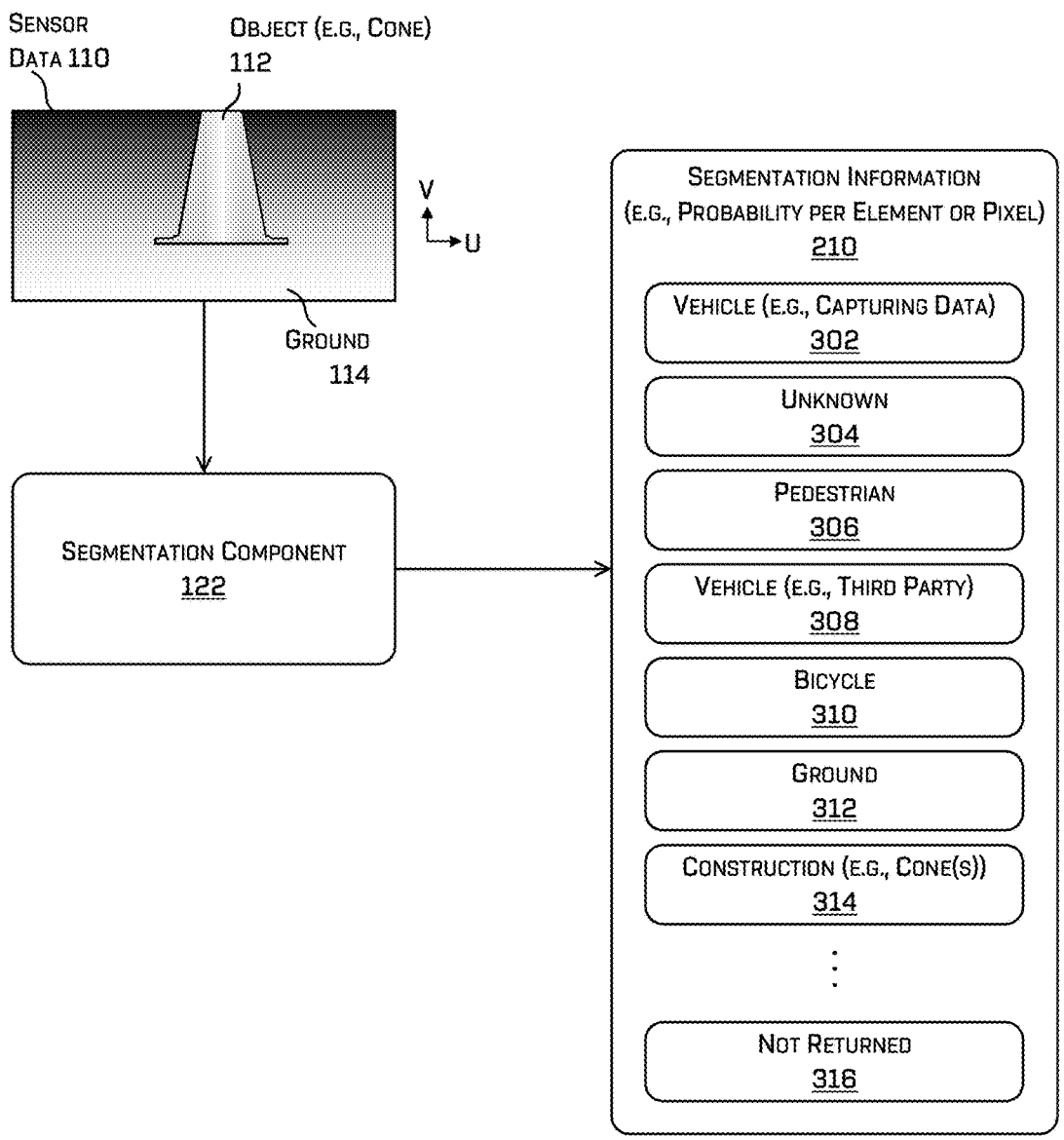
FIG. 3 is a block diagram of an example process for using a segmentation component to generate segmentation information for image data, in accordance with embodiments of the disclosure.

FIG. 3 is a block diagram of an example process 300 for using a segmentation component to generate segmentation information for image data, in accordance with embodiments of the disclosure. In some examples, the segmentation component may include a machine learned model, although other examples need not be so limiting. By representing the data as a two dimensional "image," any image processing techniques may be leveraged to provide segmentation information. Of course, the data can include any number of layers or channels and is not limited to depth information, intensity information, uncertainty information, and the like.

The sensor data 110 representing the object 112 and the ground 114 can be input to the segmentation component 122 to determine the segmentation information 210. In some instances, the segmentation information 210 can be generated for each "pixel" of the sensor data 110. In some instances, the segmentation information 210 can represent a vector indicating a probability that a pixel of the sensor data 110 represents one or more types or categories of the segmentation information 210.

In some examples, the segmentation information 210 can include classifications including, but is not limited to, a vehicle (e.g., capturing the sensor data 110) 302, unknown 304, a pedestrian 306, a vehicle (e.g., a third party vehicle) 308, a bicycle 310, a ground 312, construction (e.g., cone(s)) 314, not returned 316, and the like.

In some instances, the segmentation component 122 can represent any machine learning algorithm or machine learning model, such as a neural network. In some instances, the segmentation component 122 can be trained using sensor data captured by a time of flight data that includes ground truth information (e.g., labeling aspects of the sensor data with the appropriate classifications 302-316).

In some examples, individual probabilities of the classifications 302-316 may add up to a probability of 1. The classifications 302-316 are examples and more or fewer classifications are contemplated herein.

Figure 4:
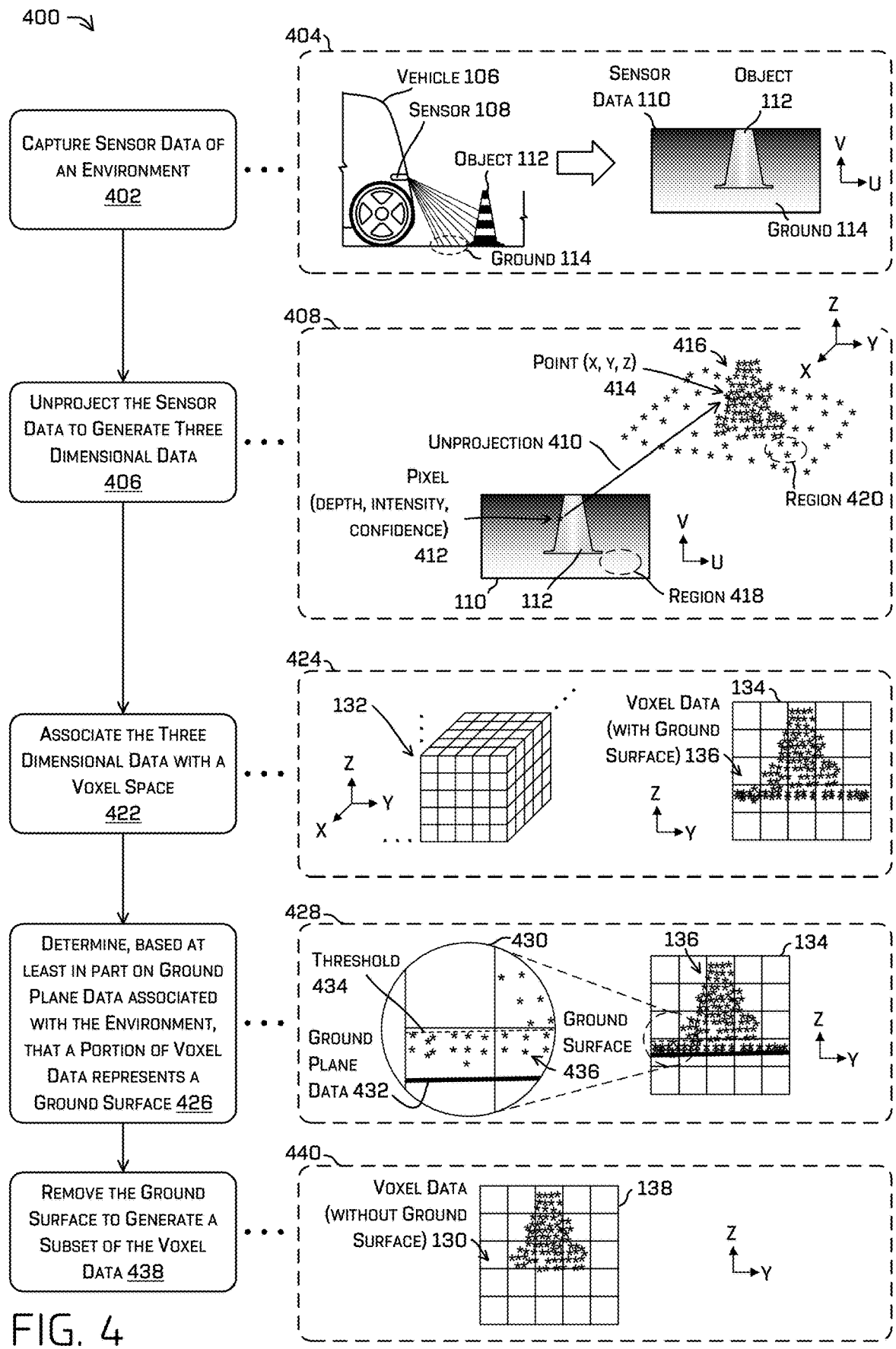
FIG. 4 is pictorial flow diagram of an example process of a second technique for removing a ground surface based on ground plane data, in accordance with embodiments of the disclosure.

FIG. 4 is pictorial flow diagram of an example process 400 of a second technique for removing a ground surface based on ground plane data, in accordance with embodiments of the disclosure.

In some examples, the process 400 illustrates operations associated with the second technique 120 of FIG. 1.

At operation 402, the process can include capturing sensor data of an environment. In some instances, the operation 402 can substantially correspond to the operations 102 or 202 of FIGS. 1 and 2, respectively. An example 404 illustrates the vehicle 106 including the sensor 108 capturing the sensor data 110 of the environment. In some instances, the sensor data 110 can represent the object 112 and the ground 114 in the environment.

At operation 406, the process can include unprojecting the sensor data to generate three dimensional data. An example 408 illustrates an unprojection 410 operation whereby a pixel 412 (e.g., represented as two dimensional data in the sensor data 110) is unprojected to determine a point 414 of three dimensional data 416. In some examples, the pixel 412 can include depth information, intensity information, and/or confidence information. In some instances, the point 414 can represent the pixel 412 in the three dimensional data 416. That is, the point 414 can comprise an x-coordinate, y-coordinate, and a z-coordinate. By way of example, and without limitation, data associated with a region 418 in the sensor data 110 can correspond to data in a region 420 in the three dimensional data 416

In some instances, the unprojection 410 can be based at least in part on extrinsic information associated with the sensor 108, such as the location of the sensor 108 on the vehicle 106, a height of the sensor 108, a direction of the sensor 108, a field of view of the sensor 108, and the like. In some instances, the pixel 412 can be unprojected based on a known location of the sensor 108 into the environment based at least in part on the depth information associated with the pixel 412.

At operation 422, the process can include associating the three dimensional data with a voxel space. An example 424 illustrates the voxel space 132, whereby the three dimensional data 416 can be associated with the voxel space 132.

In some examples, the three dimensional data 416 can be input to the voxel space 132 based at least in part on the (x, y, z) coordinates of each point associated with the three dimensional data 416.

The example 424 further illustrates the plan view 134 of the voxel space 132 comprising the voxel data (with ground surface) 136.

At operation 426, the process includes determining, based at least in part on ground plane data associated with the environment, that a portion of voxel data represents a ground surface. An example 428 illustrates the plan view 134 of the voxel space 132 comprising the voxel data 136.

A detail 430 of the voxel plan view 134 illustrates ground plane data 432 associated with the voxel space 132. In some instances, the ground plane data 432 can correspond to a three dimensional mesh representing a known or validated portion of the environment. In some instances, the operation 426 can further include determining a location of the environment (e.g., by localizing the vehicle 106 in the environment) and accessing the ground plane data 432 based on the location in the environment (e.g., as may be provided by a map, a mesh, or otherwise). In at least some examples, the ground plane may also be determined based at least in part on other sensor modalities (e.g., as discussed in U.S. patent application Ser. No. 15/622,905, filed Jun. 14, 2017, which is herein incorporated by reference, in its entirety) and/or region growing of points in the voxel space immediately proximate the vehicle 106, as well as any combination of determining a ground plane as defined herein.

The ground plane data 432 can be associated with a threshold height 434. The threshold height 434 can correspond to any height, such as 2 cm, 20 cm 50 cm, and the like above the ground plane data 432. Of course, the threshold height 434 can represent any distance and is not limited to the examples discussed herein. In at least some examples, such a threshold height may be determined based at least in part on a level of noise, uncertainty, or otherwise associated with the sensor.

In some instances, the operation 426 can include determining a ground surface 436 as corresponding to a portion of the voxel data 136 falling within or residing between the ground plane data 432 and the threshold 434. In some instances, voxel data associated with the ground surface 436 can be tagged with data indicating that the data corresponds to the ground surface 436.

At operation 438, the process can include removing the ground surface to generate a subset of the voxel data. An example 440 illustrates the voxel space 138 comprising the voxel data 130 representing the object 112 without the ground surface 436.

In some examples, the voxel data 130 represented in the voxel space 138 can be clustered to determine object(s), as discussed herein.

Figure 5:
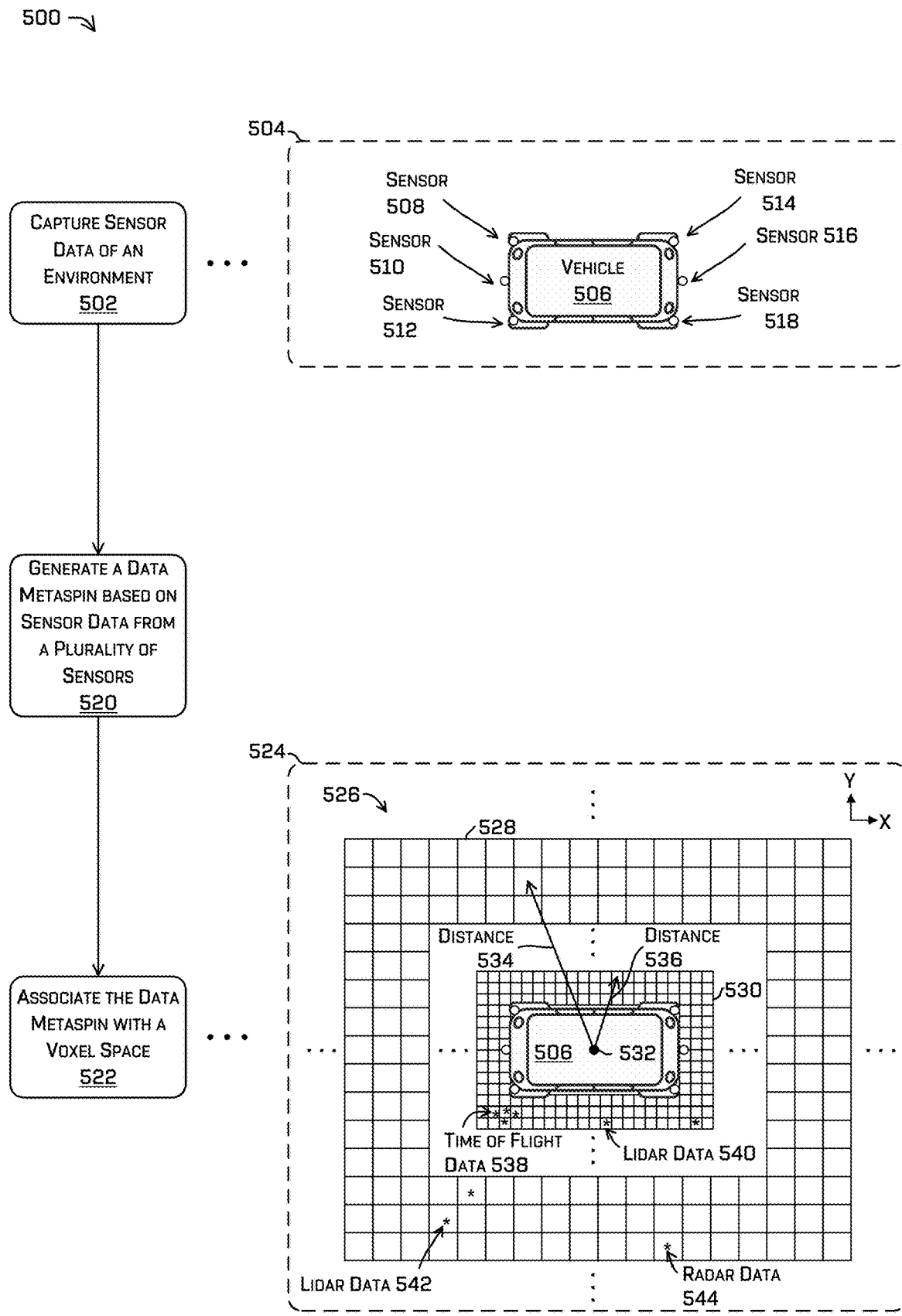
FIG. 5 is pictorial flow diagram of an example process for capturing sensor data, generating a data metaspin, and associating the data metaspin with a voxel space, in accordance with embodiments of the disclosure.

FIG. 5 is pictorial flow diagram of an example process 500 for capturing sensor data, generating a data metaspin, and associating the data metaspin with a voxel space, in accordance with embodiments of the disclosure.

At operation 502, the process can include capturing sensor data of an environment. An example 504 illustrates a vehicle 506 comprising a plurality of sensors 508, 510, 512, 514, 516, and 518 configured to captured sensor data in accordance with the operation 502. In some examples, the vehicle 506 can include more or fewer sensors than those illustrated in the example 504. In some examples, the sensors 508-518 can include, but are not limited to, one or more of a time of flight sensor, a lidar sensor, a radar sensor, an image sensor, a sonar sensor, and the like.

At operation 520, the process can include generating a data metaspin based on sensor data from a plurality of sensors. For example, the operation 520 can include fusing, concatenating, or otherwise combining sensor data from one or more of the sensors 508-518 to generate the data metaspin. In some examples, the operation 520 can include aligning the sensor data and associating portions in common to combine the various sensor data.

At operation 522, the process can include associating the data metaspin with a voxel space. An example 524 illustrates a voxel space 526 associated with the vehicle 506. In some examples, the voxel space 526 may represent an area 100 meters wide, 100 meters long, and 20 meters high. Further, each voxel in the voxel space 526 may represent a physical area, such as 25 centimeters in each dimension. As may be understood in the context of this disclosure, the voxel space 526 may represent any area of an environment, and individual voxels may represent any volume as well. In some instances, voxels may be a uniform size throughout the voxel space, while in some instances, a volume of a voxel may vary based on a location of the voxel relative to an origin of the data. For example, a first region 528 illustrates voxels associated with a first size while a second region 530 illustrates voxels associated with a second size.

In some instances, a size of a voxel in a voxel space 526 may increase in proportion to a distance from the voxel to an origin 532. For example, a voxel located at a distance 534 from the origin 532 may represent a larger portion of the environment relative to a voxel located at a distance 536 from the origin, where the distance 534 is greater than the distance 536.

In some examples, the voxel space 526 can represent a plurality of sensor data captured by a plurality of sensors. For example, the voxel space 526 can comprise time of flight data 538, lidar data 540, lidar data 542, radar data 544, and the like. Of course, the sensor data illustrated in the voxel space 526 is illustrative and additional combinations are contemplated herein.

Figure 6:
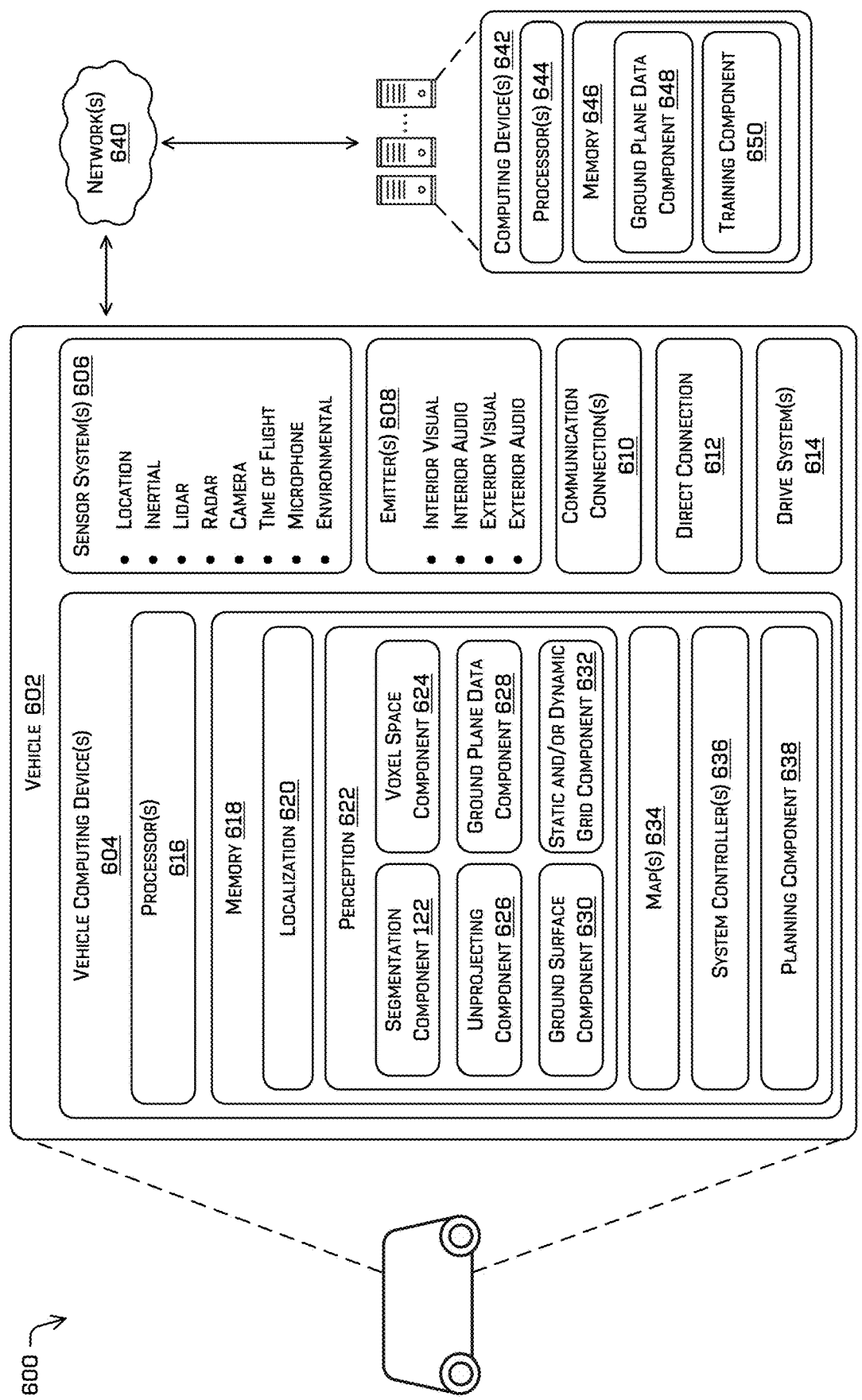
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can correspond to the vehicle 106 of FIG. 1 and the vehicle 506 of FIG. 5.

The vehicle 602 can include vehicle computing device(s) 604, one or more sensor systems 606, one or more emitters 608, one or more communication connections 610, at least one direct connection 612, and one or more drive systems 614.

The vehicle computing device(s) 604 can include one or more processors 616 and memory 618 communicatively coupled with the one or more processors 616. In the illustrated example, the vehicle 602 is an autonomous vehicle; however, the vehicle 602 could be any other type of vehicle or robotic platform. In the illustrated example, the memory 618 of the vehicle computing device(s) 604 stores a localization component 620, a perception component 622 comprising the segmentation component 122, a voxel space component 624, an unprojecting component 626, a ground plane data component 628, a ground surface component 630, and a static and/or dynamic grid component 632, one or more maps 634, one or more system controllers 636, and a planning component 638. Though depicted in FIG. 6 as residing in the memory 618 for illustrative purposes, it is contemplated that the localization component 620, the perception component 622, the segmentation component 122, the voxel space component 624, the unprojecting component 626, the ground plane data component 628, the ground surface component 630, the static and/or dynamic grid component 632, the one or more maps 634, the one or more system controllers 636, and the planning component 638 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for determining to retrieve map data including ground plane data from memory, as discussed herein.

In some instances, and in general, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, stoplight, stop sign, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the segmentation component 122 can include functionality to receive sensor data captured by a sensor (e.g., a time of flight sensor) and determine segmentation information associated with the sensor data. As discussed herein, the segmentation component 122 can generate segmentation information including but not limited to a vehicle (e.g., the vehicle in which the sensor is disposed on), unknown, pedestrian, vehicle (e.g., a third party vehicle), bicycle, ground, construction (e.g., cone(s)), not returned, and the like. In some instances, the segmentation component 122 can include filtering operations (e.g., such as median filtering) to remove noisy data prior determining segmentation information associated with sensor data. In some instances, the segmentation component 122 can determine segmentation information using one or more of (but is not limited to): machine learning model(s); thresholding; clustering; motion and interactive segmentation; compression algorithm(s); histogram-based algorithm(s); edge detection; region-growing; Markov random fields; annealing or simulated annealing; and the like.

The voxel space component 624 can include functionality to generate a voxel space proximate to the vehicle 602. As discussed herein, in some instances, the voxel space component 624 can associate three dimensional data with a voxel data. In some instances, the voxel space component 624 can determine a size of a voxel of the voxel space based on a distance between the vehicle and the voxel (e.g., a voxel close to the vehicle may be relatively smaller than a voxel that is further from the vehicle). In some instances, the voxel space component 624 can generate a voxel space for individual time steps as the vehicle 602 traverses an environment. That is, if the perception component 622 is operating at 10 Hz, the voxel space component 624 can update the voxel space 10 times per second. Of course, the frequency discussed herein is an example and other frequencies are contemplated herein.

In some examples, the voxel space generated by the voxel space component 624 (and object represented in the voxel space) include a global position and/or a location position (e.g., relative to the vehicle 602 for an instance of the voxel space).

The unprojecting component 626 can include functionality to unproject sensor data (e.g., two dimensional time of flight data) to generate three dimensional data. For example, the unprojecting component 626 can receive time of flight data comprising depth information, intensity information, and/or confidence information and can unproject the two dimensional data into three dimensions. In some instances, the unprojecting component 626 can unproject the sensor data based at least in part on intrinsic and/or extrinsic information associated with a sensor capturing any such sensor data. In some instances, the unprojecting component 626 can using filtering techniques (e.g., median filtering) to remove noisy data while projecting from two dimensional data to three dimensional data.

The ground plane data component 628 can include functionality to receive ground plane data based on a location of the vehicle 602 in an environment and/or otherwise determine a ground plane based data from on one or more sensors. In some instances, the ground plane data component 628 can associate the ground plane data with a voxel space to determine a portion of the three dimensional data that corresponds to the ground plane data. In some instances, the ground plane data component 628 can receive ground plane data from the maps 634 component. In some instances, the ground plane data can correspond to a three dimensional mesh based at least in part on lidar data captured by a plurality of vehicles having traversed through an environment. Accordingly, the ground plane data can accurately represent a ground plane associated with an environment.

The ground surface component 630 can include functionality to remove a ground surface associated with sensor data, as discussed herein. In some instances, the ground surface component 630 can receive segmentation information determined by the segmentation component 122 and can remove a ground surface associated with such segmentation information. In some instances, the ground surface component 630 can receive ground plane data from the ground plane data component 628 and remove voxel data within a threshold distance (or height) of the ground plane data. In some instances, the ground surface component 630 can use segmentation information and ground plane data to remove a ground surface associated with sensor data.

The static and/or dynamic grid component 632 can include functionality to determine object(s) represented in a voxel space and to associated the object(s) with one of a dynamic grid or a static grid. For example, the static and/or dynamic grid component can use clustering techniques on voxel data (with the ground surface removed) to cluster voxels based on occupancy (e.g., whether a voxel includes data), adjacency (e.g., whether an occupied voxel is directly adjacent to another occupied voxel (or within a threshold distance of an occupied voxel)), and/or based on segmentation information determined as discussed herein. In some instances, the static and/or dynamic grid component 632 can compare an object with a dynamic grid that maintains dynamic objects proximate to the vehicle 602 to determine if the object corresponds to an object in the dynamic grid. If the object does not correspond to an object in the dynamic grid, the static and/or dynamic grid component 632 can associate the object with the static grid, although in some instances, the operations may include evaluating voxel data over time to determine that an object is a dynamic object (e.g., if a dynamic object enters a field of view of the sensors).

In some instances, the static and/or dynamic grid component 632 can use ray casting techniques over time to determine if an object is a static object or a dynamic object. For example, a voxel space associated with a first time can be compared to a voxel space associated with a second time after the first time. A ray can be projected from an origin associated with the vehicle 602 through voxels in the voxel space. Regions that were occupied at the first time and are not occupied at the second time can be identified and can be used to determine whether an object is a static object or a dynamic object. Examples of distinguishing between dynamic object(s) and static object(s) are discussed in U.S. patent application Ser. No. 15/622,905, filed Jun. 14, 2017. Application Ser. No. 15/622,905 is herein incorporated by reference, in its entirety.

The memory 618 can further include one or more maps 634 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 634 can include at least one map (e.g., images and/or a mesh).

In some examples, the vehicle 602 can be controlled based at least in part on the maps 634. That is, the maps 634 can be used in connection with the localization component 620, the perception component 622 (and subcomponents), and/or the planning component 638 to determine a location of the vehicle 602, identify objects in an environment, and/or generate routes and/or trajectories to navigate within an environment.

In some examples, the one or more maps 634 can be stored on a remote computing device(s) (such as the computing device(s) 642) accessible via network(s) 640. In some examples, multiple maps 634 can be stored based on, for example, a characteristic (e.g., type of entity, time of day, day of week, season of the year, etc.). Storing multiple maps 634 can have similar memory requirements, but can increase the speed at which data in a map can be accessed.

In some examples, the one or more maps 634 can store ground plane data associated with individual locations in an environment. For example, as the vehicle 602 traverses the environment and as maps representing an area proximate to the vehicle 602 are loaded into memory, ground plane data associated with a location can be loaded into memory as well. In some examples, ground plane data can be generated dynamically based on map data (which may be in the form of a mesh, or the like) or based on captured data (e.g., lidar data, time of flight data, GPS data, and the like).

In general, the planning component 638 can determine a path for the vehicle 602 to follow to traverse the environment. For example, the planning component 638 can determine various routes and trajectories and various levels of detail. For example, the planning component 638 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 638 can generate an instruction for guiding the autonomous vehicle along at least a portion of the route from the first location to the second location. In at least one example, the planning component 638 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In some instances, the planning component 638 can generate one or more trajectories for the vehicle 602 based at least in part on the knowledge of static and/or dynamic objects determined according to the techniques discussed herein. In some examples, the planning component 638 can use temporal logic, such as linear temporal logic and/or signal temporal logic, to evaluate one or more trajectories of the vehicle 602.

In at least one example, the vehicle computing device(s) 604 can include one or more system controllers 636, which can be configured to control steering, propulsion, braking, safety, emitters, communication, and other systems of the vehicle 602. These system controller(s) 636 can communicate with and/or control corresponding systems of the drive system(s) 614 and/or other components of the vehicle 602.

As can be understood, the components discussed herein (e.g., the localization component 620, the perception component 622, the segmentation component 122, the voxel space component 624, the unprojecting component 626, the ground plane data component 628, the ground surface component 630, the static and/or dynamic grid component 632, the one or more maps 634, the one or more system controllers 636, and the planning component 638) are described as divided for illustrative purposes. However, the operations performed by the various components can be combined or performed in any other component. By way of example, processing static and/or dynamic grids may be performed by the planning component 638 (e.g., rather than the static and/or dynamic grid component 632) to reduce the amount of data transferred by the system.

In at least one example, the sensor system(s) 606 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the time of flight sensors can include individual time of flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604. Additionally or alternatively, the sensor system(s) 606 can send sensor data, via the one or more networks 640, to the one or more computing device(s) 642 at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 640. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In at least one example, the localization component 620, the perception component 622, the segmentation component 122, the voxel space component 624, the unprojecting component 626, the ground plane data component 628, the ground surface component 630, the static and/or dynamic grid component 632, the one or more maps 634, the one or more system controllers 636, and the planning component 638 can process sensor data, as described above, and can send their respective outputs, over the one or more network(s) 640, to one or more computing device(s) 642. In at least one example, the localization component 620, the perception component 622, the segmentation component 122, the voxel space component 624, the unprojecting component 626, the ground plane data component 628, the ground surface component 630, the static and/or dynamic grid component 632, the one or more maps 634, the one or more system controllers 636, and the planning component 638 can send their respective outputs to the one or more computing device(s) 642 at a particular frequency, after a lapse of a predetermined period of time, in near real-time, etc.

In some examples, the vehicle 602 can send sensor data to one or more computing device(s) 642 via the network(s) 640. In some examples, the vehicle 602 can send raw sensor data to the computing device(s) 642. In other examples, the vehicle 602 can send processed sensor data and/or representations of sensor data to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can include processor(s) 644 and a memory 646 storing a ground plane data component 648 and a training component 650.

In some instances, the ground plane data component 648 can include ground plane data accessible by the vehicle 602. In some instances, the ground plane component 648 can substantially correspond to the ground plane data component 628 in the vehicle 602.

In some instances, the training component 650 can include functionality to train one or more models to determine segmentation information, as discussed herein. In some instances, the training component 650 can communicate information generated by the one or more models to the vehicle computing device(s) 604 to revise how to control the vehicle 602 in response to different situations.

For instance, aspects of some or all of the components discussed herein can include any models, algorithms, and/or machine learning algorithms. For example, in some instances, the components in the memory 646 (and the memory 618, discussed above) can be implemented as a neural network. In some examples, the training component 650 can utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s)

642 can be associated with the vehicle 602. That is, the vehicle 602 can perform one or more of the functions associated with the computing device(s) 642, and vice versa. Further, aspects of the perception component 622 (and subcomponents) can be performed on any of the devices discussed herein.

Figure 7:
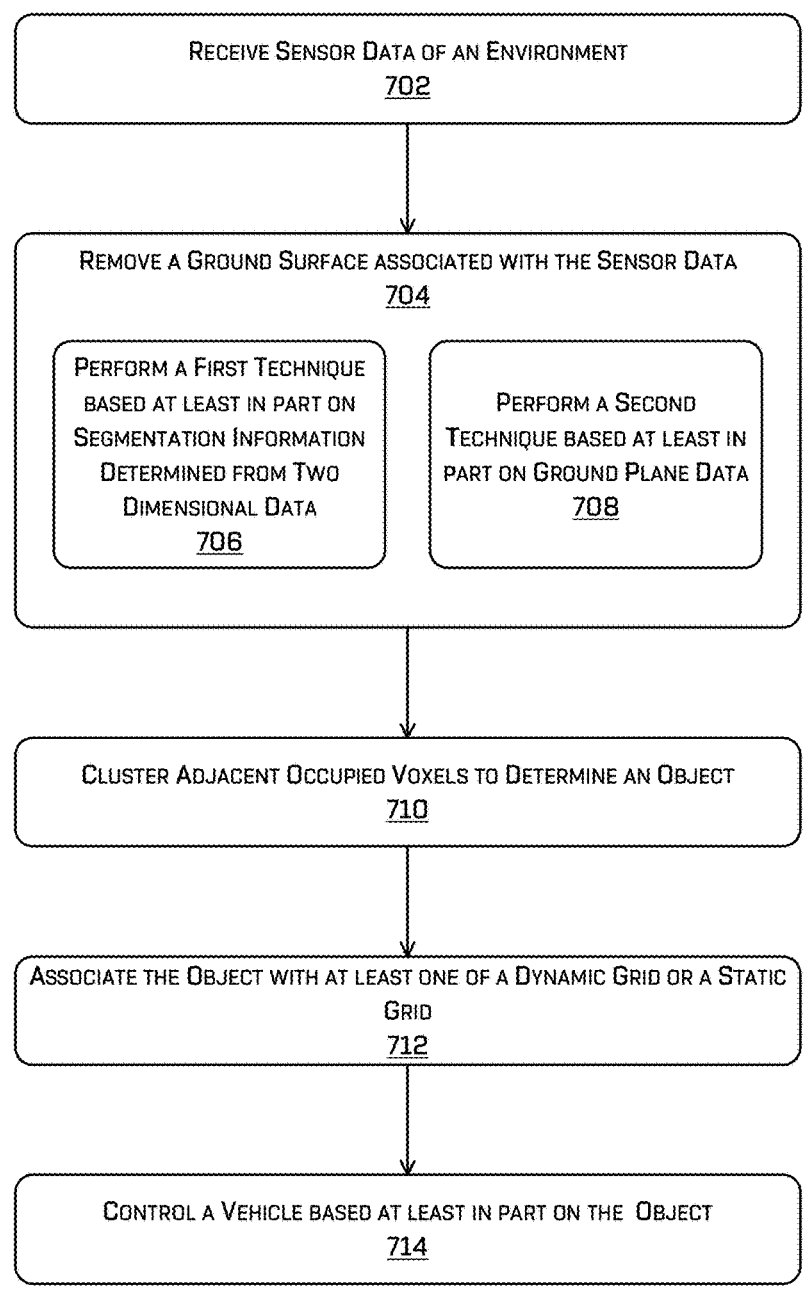
FIG. 7 depicts an example process for capturing sensor data, removing a ground surface, clustering voxels to determine objects, and controlling a vehicle based on the objects, in accordance with embodiments of the disclosure.

FIG. 7 depicts an example process 700 for capturing sensor data, removing a ground surface, clustering voxels to determine objects, and controlling a vehicle based on the objects, in accordance with embodiments of the disclosure. For example, some or all of the process 700 can be performed by one or more components in FIG. 6, as described herein. For example, some or all of the process 700 can be performed by the vehicle computing device(s) 604. Further, any of the operations described in the example process 700 may be executed in parallel, in a different order than depicted in the process 700, omit any of the operations of the depicted process 700, and/or be combined with any of the operations discussed herein.

At operation 702, the process can include receiving sensor data of an environment. In some examples, the operation 702 can include receiving and/or capturing time of flight data, lidar data, image data, radar data, and the like, of the environment. In some examples, the operation 702 can be performed by a vehicle (e.g., an autonomous vehicle) as the vehicle traverses the environment. In some instances, the operation 702 can further include combining a plurality of sensor data from a plurality of sensors to determine a data metaspin, as discussed herein.

At operation 704, the process can include removing a ground surface associated with the sensor data. In some instances, the operation 704 can include performing a first technique (operation 706) and/or performing a second technique (operation 708) as discussed herein.

At operation 706, the process can include performing a first technique based at least in part on segmentation information determined from two dimensional data. Examples of the first technique are discussed in connection with FIGS. 1-3, as well as throughout the disclosure. In some instances, the operation 706 can include inputting the sensor data into a segmentation component to determine segmentation information associated with the sensor data. For example, the segmentation component can identify "pixels" of sensor data that are likely associated with a ground surface. With a ground surface identified and removed, the operation 706 can include unprojecting the sensor data to generate three dimensional data and associating the three dimensional data with a voxel space.

At operation 708, the process can include performing a second technique based at least in part on ground plane data. In some examples, the ground plane data can be based at least in part on other sensor data captured by other sensor modalities (e.g., lidar data), region growing techniques, map data or mesh data accessed from memory, and the like. Examples of the second technique are discussed in connection with FIGS. 1 and 4, as well as throughout the disclosure. In some instances, the operation 708 can include unprojecting the sensor data to generate three dimensional data and associating the three dimensional data with a voxel space. Further, the operation 708 can include accessing ground plane data and associating the ground plane data with the voxel space. The operation 708 can further include determining a ground surface by identifying voxel data and/or voxels within a threshold distance of the ground plane data. The ground surface can be removed.

At operation 710, the process can include clustering adjacent occupied voxels to determine an object. For example, the operation 710 receives a voxel space including voxel data with any ground surface removed. Voxels that are occupied and adjacent can be clustered or otherwise grouped to represent object(s). For example, voxels can be clustered based at least in part on segmentation information generated using the techniques discussed herein.

At operation 712, the process can include associating the object with at least one of a dynamic grid or a static grid. In some instances, the operation 712 can include determining whether the voxel grid corresponds to a dynamic object stored in a dynamic grid. If the object does not correspond to an object in the static grid, the operation 712 can include associating the object with a static grid. In some instances, the operation 712 can include determining that the object is a dynamic object by comparing voxel spaces representing the object over time to determine, using ray casting techniques, for example, whether the object has moved relative or absolute locations within the voxel space.

At operation 714, the process can include controlling a vehicle based at least in part on the object. In some instances, the operation 714 can include generating a trajectory to stop the vehicle or to otherwise control the vehicle to safely traverse the environment.

EXAMPLE CLAUSES

A: A system comprising: one or more processors; and one or more computer-readable media storing instructions executable by the one or more processors, wherein the instructions, when executed, cause the system to perform operations comprising: receiving sensor data of an environment captured by a time of flight sensor on an autonomous vehicle, the sensor data arranged as a two dimensional image, wherein an individual element of one or more channels of the two dimensional image comprises one or more of depth information, intensity information, or confidence information; determining, based at least in part on the two dimensional image, three dimensional data, wherein point data of the three dimensional data represents the sensor data in three dimensions; associating, as voxel data, the three dimensional data with a voxel space; receiving ground plane data associated with a location of the autonomous vehicle; determining, based at least in part on the ground plane data, that a portion of the voxel data represents a ground surface; removing the ground surface from the voxel data to determine a subset of the voxel data; clustering voxels in the subset of the voxel data to determine an object; associating the object with at least one of a dynamic grid or a static grid; and controlling the autonomous vehicle based at least in part on the object associated with at least one of the dynamic grid or the static grid.

B: The system of paragraph A, the operations further comprising: inputting the sensor data into a machine learning model trained to generate segmentation information for individual elements of the two dimensional image; and determining that the portion of the voxel data represents the ground surface further based at least in part on the segmentation information; wherein clustering the voxels is based at least in part on a position of occupied voxels and the segmentation information associated with the individual elements of the two dimensional image.

C: The system of paragraph A or B, the operations further comprising: determining the location of the autonomous vehicle in the environment; and accessing the ground plane data from a data store based at least in part on the location.

D: The system of any of paragraphs A-C, wherein the voxel data is first voxel data associated with a first time, the voxel space is a first voxel space associated with the first time, and the operations further comprise: associating second voxel data with a second voxel space, the second voxel data associated with a second time after the first time; determining, based at least in part on the first voxel space and the second voxel space, a probability that the object is a dynamic object; and associating the object and the probability with the at least one of the dynamic grid or the static grid.

E: The system of any of paragraphs A-D, wherein the ground plane data comprises a three dimensional mesh of the environment.

F: A method comprising: receiving sensor data of an environment captured by a sensor, the sensor data being represented as a two dimensional image having one or more channels; removing a ground surface comprising at least one of: performing a first technique to: remove, as a subset of the sensor data, the ground surface from the sensor data, the first technique based at least in part on segmentation information determined from the two dimensional image; and represent the subset of the sensor data as voxel data; or performing a second technique to: represent the sensor data as voxel data; and remove, as a subset of the voxel data, the ground surface from the voxel data, the second technique based at least in part on ground data; and clustering voxels of the voxel data or the subset of the voxel data to determine an object.

G: The method of paragraph F, wherein the sensor is disposed on a vehicle, the method further comprising: associating the object with at least one of a dynamic grid or a static grid; and controlling the vehicle based at least in part on the object associated with at least one of the dynamic grid or the static grid.

H: The method of paragraph F or G, wherein performing the first technique comprises: inputting the sensor data into a machine learning model trained to generate the segmentation information for individual elements of the two dimensional image; and removing, based at least in part on the segmentation information, the ground surface from the sensor data to determine the subset of the sensor data.

I: The method of paragraph H, wherein representing the subset of the sensor data as the voxel data comprises: unprojecting the subset of the sensor data to generate three dimensional data; and associating, as the voxel data, the three dimensional data with a voxel space.

J: The method of any of paragraphs F-I, wherein performing the second technique comprises: unprojecting the sensor data to generate three dimensional data; associating, as the voxel data, the three dimensional data with a voxel space; determining the ground data based at least in part on a location in the environment; determining, based at least in part on the ground data, that a portion of the voxel data represents the ground surface; and removing the ground surface from the voxel data to determine the subset of the voxel data.

K: The method of paragraph J, wherein determining that the portion of the voxel data represents the ground surface comprises determining that the portion of the voxel data is within a threshold height above the ground data.

L: The method of paragraph J or K, wherein determining the ground data based at least in part on the location comprises at least one of: receiving the ground data from a data store storing map data associated with the location; or generating the ground data based on additional sensor data captured at the location in the environment.

M: The method of any of paragraphs F-L, wherein the first technique and the second technique are performed substantially simultaneously to generate the segmentation information and to remove the ground surface from the voxel data based at least in part on the ground data.

N: The method of any of paragraphs F-M, wherein removing the ground surface comprises performing the first technique, and wherein clustering the voxels is based at least in part on the segmentation information.

O: A non-transitory computer-readable medium storing instructions that, when executed, cause one or more processors to perform operations comprising: receiving sensor data from a sensor, the sensor data represented as an image having one or more channels; segmenting the image based at least in part on classifications, the classifications comprising a ground surface classification; unprojecting, as three dimensional data, at least a portion of the sensor data into a voxel grid; removing a ground surface associated with the sensor data to generate a subset of the three dimensional data; and clustering the subset of the three dimensional data to determine an object.

P: The non-transitory computer-readable medium of paragraph O, the operations further comprising: associating the object with one or more of a static grid or a dynamic grid; and controlling a vehicle based at least in part on the static grid or the dynamic grid.

Q: The non-transitory computer-readable medium of paragraph P, wherein clustering the subset of the three dimensional data to determine the object is based at least in part on the classifications.

R: The non-transitory computer-readable medium of any of paragraphs O-Q, wherein removing the ground surface associated with the sensor data to generate the subset of the three dimensional data is based at least in part on the classifications.

S: The non-transitory computer-readable medium of any of paragraphs O-R, wherein removing the ground surface associated with the sensor data to generate the subset of the three dimensional data is based at least in part on determining that a portion of the three dimensional data is within a threshold height of ground data.

T: The non-transitory computer-readable medium of paragraph S, wherein the ground data is determined based at least in part on at least one of: receiving the ground data from a data store storing map data associated with a location in an environment; or generating the ground data based on one or more of the sensor data or additional sensor data captured representing the environment.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving sensor data representing an environment associated with a vehicle;
   inputting the sensor data into a machine learned model;
   receiving, from the machine learned model, segmentation information for individual elements of the sensor data;
   associating the segmentation information with a voxel grid;
   determining, based at least in part on the segmentation information, that a first portion of the sensor data represents a ground surface in the environment;
   removing data representing the ground surface from the sensor data; and
   determining that a second portion of the sensor data represents an object in the environment.

2. The system of claim 1, wherein the segmentation information comprises a first probability that an individual element of the sensor data is associated with a first classification and a second probability that the individual element is associated with a second classification.

3. The system of claim 1, the operations further comprising:
   determining a location of the vehicle in the environment;
   accessing ground plane data from a data store based at least in part on the location; and
   determining that the first portion of the sensor data represents the ground surface in the environment further based at least in part on the ground plane data.

4. The system of claim 1, the operations further comprising:
   associating a third portion of the sensor data with the voxel grid; and
   determining that the object is one or more of a static object or a dynamic object based at least in part on the segmentation information and the third portion of the sensor data.

5. The system of claim 4, wherein the data is first data, the operations further comprising:
   based at least in part on determining that the object is a dynamic object, associating second data representing the object with a dynamic grid.

6. The system of claim 4, wherein the sensor data comprises at least one of image data, lidar data, radar data, audio data, or time of flight data, the operations further comprising:
   receiving additional sensor data comprising a type that differs from the sensor data;
   determining additional semantic information associated with the additional sensor data; and
   associating a portion of the additional semantic information with the voxel grid.

7. The system of claim 1, the operations further comprising:
   receiving the sensor data from a sensor of the vehicle; and
   controlling the vehicle based at least in part on the object.

8. The system of claim 1, the operations further comprising:
   clustering the sensor data based at least in part on the segmentation information.

9. A method comprising:
   receiving sensor data representing an environment associated with a vehicle;
   inputting the sensor data into a machine learned model;
   receiving, from the machine learned model, segmentation information for individual elements of the sensor data;
   associating the segmentation information with a voxel grid;
   determining, based at least in part on the segmentation information, that a first portion of the sensor data represents a ground surface in the environment; and
   determining that a second portion of the sensor data represents an object in the environment.

10. The method of claim 9, wherein the segmentation information comprises a first probability that an individual element of the sensor data is associated with a first classification and a second probability that the individual element is associated with a second classification.

11. The method of claim 9, further comprising:
    determining a location of the vehicle in the environment;
    accessing ground plane data from a data store based at least in part on the location; and
    determining that the first portion of the sensor data represents the ground surface in the environment further based at least in part on the ground plane data.

12. The method of claim 9, further comprising:
    associating a third portion of the sensor data with the voxel grid; and
    determining that the object is at least one of a static object or a dynamic object based at least in part on the third portion of the sensor data.

13. The method of claim 9, further comprising:
    receiving the sensor data from a sensor of the vehicle; and
    controlling the vehicle based at least in part on the object.

14. The method of claim 9, further comprising:
    clustering the sensor data based at least in part on the segmentation information.

15. One or more non-transitory computer-readable media storing instructions executable by one or more processors, wherein the instructions, when executed, cause the one or more processors to perform operations comprising:
    receiving sensor data representing an environment associated with a vehicle;
    inputting the sensor data into a machine learned model;
    receiving, from the machine learned model, segmentation information for individual elements of the sensor data;
    associating the segmentation information with a voxel grid;
    determining, based at least in part on the segmentation information, that a first portion of the sensor data represents a ground surface in the environment;
    removing data representing the ground surface from the sensor data; and
    determining that a second portion of the sensor data represents an object in the environment.

16. The one or more non-transitory computer-readable media of claim 15, wherein the segmentation information comprises a first probability that an individual element of the sensor data is associated with a first classification and a second probability that the individual element is associated with a second classification.

17. The one or more non-transitory computer-readable media of claim 15, the operations further comprising:
   determining a location of the vehicle in the environment;
   accessing ground plane data from a data store based at least in part on the location; and
   determining that the first portion of the sensor data represents the ground surface in the environment further based at least in part on the ground plane data.

18. The one or more non-transitory computer-readable media of claim 15, the operations further comprising:
   associating a third portion of the sensor data with the voxel grid; and
   determining that the object is at least one of a static object or a dynamic object based at least in part on the third portion of the sensor data.

19. The one or more non-transitory computer-readable media of claim 15, the operations further comprising:
   receiving the sensor data from a sensor of the vehicle; and
   controlling the vehicle based at least in part on the object.

20. The one or more non-transitory computer-readable media of claim 15, the operations further comprising:
   clustering the sensor data based at least in part on the segmentation information.

\* \* \* \* \*